US012686077B2

(12) United States Patent
Chen et al.

(10) Patent No.: US 12,686,077 B2
(45) Date of Patent: Jul. 21, 2026

(54) LASER PROCESSING METHOD AND LASER PROCESSING SYSTEM

(71) Applicant: National Tsing Hua University, Hsinchu City (TW)

(72) Inventors: Hung-Wen Chen, Hsinchu City (TW); Chen-Wei Hu, Hsinchu City (TW); Yu-Chieh Wen, Hsinchu City (TW)

(73) Assignee: National Tsing Hua University, Hsinchu City (TW)

( * ) Notice: Subject to any disclaimer, the term of this patent is extended or adjusted under 35 U.S.C. 154(b) by 836 days.

(21) Appl. No.: 17/992,896

(22) Filed: Nov. 22, 2022

(65) Prior Publication Data

US 2023/0302573 A1 Sep. 28, 2023

(30) Foreign Application Priority Data

Mar. 28, 2022 (TW) .................................. 111111581

(51) Int. Cl.
B23K 26/0622 (2014.01)
B23K 26/064 (2014.01)
(52) U.S. Cl.
CPC ...... B23K 26/0624 (2015.10); B23K 26/0643 (2013.01)
(58) Field of Classification Search
CPC ............ B23K 26/0624; B23K 26/0643; B23K 2103/02; B23K 2103/08; B23K 2103/56; B23K 26/0608; B23K 26/067; B23K 26/382; B23K 26/40; B23K 26/402; B23K 26/60
See application file for complete search history.

(56) References Cited

U.S. PATENT DOCUMENTS

| | | | | |
|---|---|---|---|---|
| 6,489,589 | B1 * | 12/2002 | Alexander ........... | B23K 26/067 |
| | | | | 219/121.69 |
| 10,118,250 | B1 * | 11/2018 | Budd ..................... | G01B 11/26 |
| 2007/0230517 | A1 * | 10/2007 | Matsuda ................ | H01S 3/067 |
| | | | | 372/6 |
| 2014/0076863 | A1 * | 3/2014 | Moffitt ............... | B23K 26/0604 |
| | | | | 219/121.61 |
| 2019/0009359 | A1 * | 1/2019 | Soffer .................. | B23K 26/032 |
| 2019/0091798 | A1 * | 3/2019 | Schönleber ........... | B23K 26/21 |
| 2020/0398373 | A1 * | 12/2020 | Rataj .................. | B23K 26/0648 |
| 2024/0375219 | A1 * | 11/2024 | Funatsu .............. | B23K 26/342 |

FOREIGN PATENT DOCUMENTS

| | | |
|---|---|---|
| CN | 106735925 | 5/2017 |
| CN | 107790887 | 3/2018 |
| CN | 113710407 | 11/2021 |
| TW | I638253 | 10/2018 |

OTHER PUBLICATIONS

"Office Action of Taiwan Counterpart Application", issued on Mar. 3, 2023, pp. 1-9.

* cited by examiner

*Primary Examiner* — Justin C Dodson
*Assistant Examiner* — Keith Brian Assante
(74) *Attorney, Agent, or Firm* — JCIPRNET

(57) ABSTRACT

A laser processing method and a laser processing system are provided. The laser processing method includes: irradiating a processing area of a workpiece with an electromagnetic wave; and after irradiating the processing area of the workpiece with the electromagnetic wave, irradiating the processing area of the workpiece with a processing pulse.

3 Claims, 11 Drawing Sheets

PE

W2

RP intensity time

PP

E electric field intensity time

C2

C1

PP

PE

W2

RP

W2

RP

LASER PROCESSING METHOD AND LASER PROCESSING SYSTEM

CROSS-REFERENCE TO RELATED APPLICATION

This application claims the priority benefit of Taiwan applications serial no. 111111581, filed on Mar. 28, 2022. The entirety of the above-mentioned patent application is hereby incorporated by reference herein and made a part of this specification.

BACKGROUND

Technical Field

The present disclosure relates to a processing method and a processing system, particularly to a laser processing method and a laser processing system.

Description of Related Art

Compared with conventional mechanical processing, laser processing has many advantages, such as great flexibility, high accuracy, and fast speed. As it is non-contact processing, laser processing has fewer processing restrictions.

Lasers can be divided into continuous-wave laser (CW laser) and pulsed laser, depending on the way of output. The continuous-wave laser refers to the laser being output constantly to a material to be processed, where the processing area is heated by the photon energy and vaporized at the vaporization temperature. This processing method has a greater range of the thermal energy transfer, and it is suitable for cutting thicker metal materials. However, due to the greater range of thermal energy transfer, the material around the processing area may deform or have its properties changed.

The principle of the pulsed laser varies, depending on the time it takes to remove the material. If the pulsed laser removes the material in picoseconds or longer, the material would still be vaporized by the thermal energy, and thus the material is still under the influence of the thermal effect, and its heat-affected zone decreases with the reduction of pulse width. Take a non-metallic material with a wide energy level as an example. If the pulsed laser removes the material in femtoseconds, the electrons in the covalent band would generate non-linear absorption to the conduction band, and the high-energy free electrons would collide with other electrons to generate more free electrons. The number of free electrons would rise rapidly as the said phenomenon of absorption and impact occurs repetitively, and when the free electrons reach a certain density, the material is ejected from the surface and thus removed. This method has the lowest thermal effect, so it has the best processing accuracy in laser material removal, which is suitable for high-precision machining.

With the current trend of product miniaturization, the resolution and precision of precision machining are even more critical. As the key factor affecting the performance of these two aspects in laser processing is the level of thermal effect, femtosecond laser is a brilliant choice to achieve the ideal resolution and accuracy. Most of the current laser processing systems are composed of a laser source, mirrors, and focusing lenses, while some further include other optical components for beam shaping. However, such architecture can hardly make further breakthrough in processing quality and resolution. Despite it once being an ideal solution, the progress has come to a halt in the face of physical limits. Therefore, the best machining accuracy cannot be obtained by blindly pursuing narrower laser pulses.

SUMMARY

The disclosure provides a laser processing method and a laser processing system capable of improving the processing quality, resolution, and/or heat-affected zone control capability effectively.

According to an embodiment of the disclosure, a laser processing method includes: irradiating a processing area of a workpiece with an electromagnetic wave; and after irradiating the processing area of the workpiece with the electromagnetic wave, irradiating the processing area of the workpiece with a processing pulse.

According to an embodiment of the disclosure, a laser processing system includes: a laser, which generates a processing pulse; and an electromagnetic-wave source, which generates an electromagnetic wave.

To make the features and advantages of the disclosure more comprehensible, the following embodiments are described in detail with the reference to the following drawings.

BRIEF DESCRIPTION OF THE DRAWING

The drawings provide a further understanding of the disclosure, and are incorporated in and constitute a part of this specification. The drawings illustrate examples of the disclosure and, together with the description, serve to explain the principles of the disclosure.

DESCRIPTION OF THE EMBODIMENTS

Figure 1A:
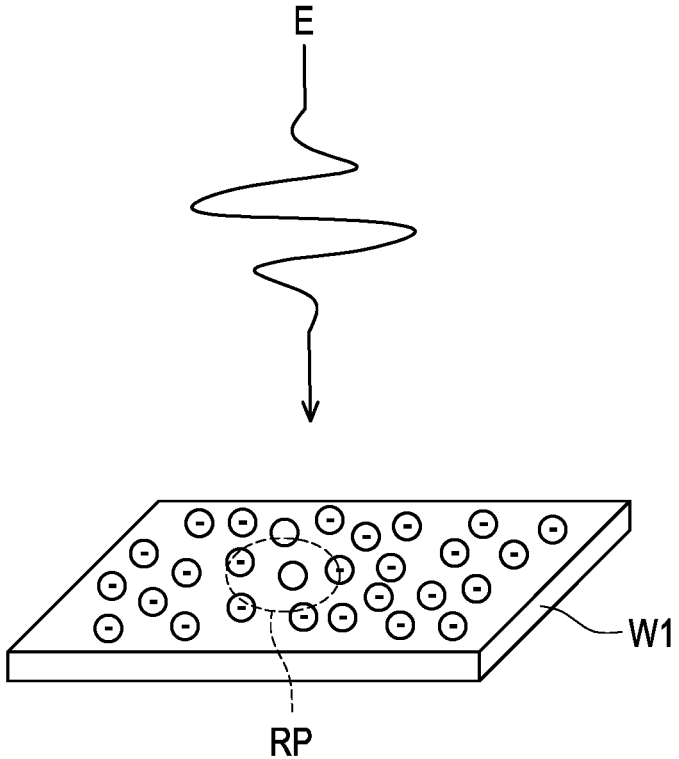
FIG. 1A to FIG. 1D are schematic flowcharts of a laser processing method according to an embodiment of the disclosure.

Directional terms mentioned herein, such as "up," "down," "front," "rear," "left," "right," etc., only refer to the directions in the drawings. Accordingly, the directional terms used are intended to illustrate rather than limit the disclosure.

In the drawings, each figure illustrates the general characteristics of methods, structures, or materials used in particular embodiments. However, these drawings should not be construed to define or limit the scope or nature encompassed by these embodiments. For example, the relative sizes, thicknesses, and positions of various layers, regions, or structures may be reduced or exaggerated for clarity.

In the following embodiments, the same or similar elements may be given the same or similar reference numerals, and the detailed description thereof will be omitted. In addition, the features in different embodiments may be combined with each other without conflict, and simple equivalent changes and modifications made according to the present specification or the scope of the claims are within the scope of the present patent.

Terms such as "first" and "second" mentioned in this specification or the claims are only to name different elements or to distinguish different embodiments or scopes, and it is not to define an upper or a lower limit of the number of components, and nor is it to limit the manufacturing or configuration order of the components. Furthermore, the disposition of an element/film layer on (or over) another element/film layer may encompass: the situation where that the element/film layer is disposed directly on (or over) the other element/film layer, and where the element/film layers are in direct contact; and the situation where the element/film layer is indirectly disposed on (or over) the other element/film layer, and where there are one or more elements/film layers between the two elements/film layers.

FIG. 1A to FIG. 1D are schematic flowcharts of a laser processing method according to an embodiment of the disclosure. In FIG. 1A to FIG. 1D, the workpiece W1 is, for example, a metal material, but it is not limited thereto.

Figure 1B:
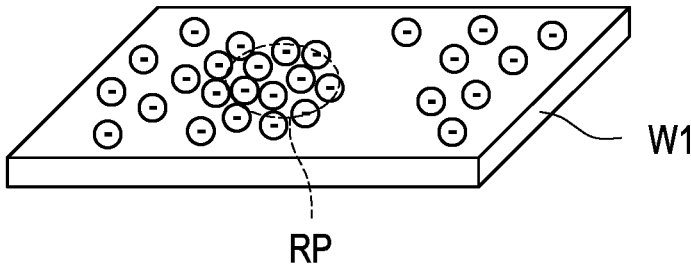
Figure 1C:
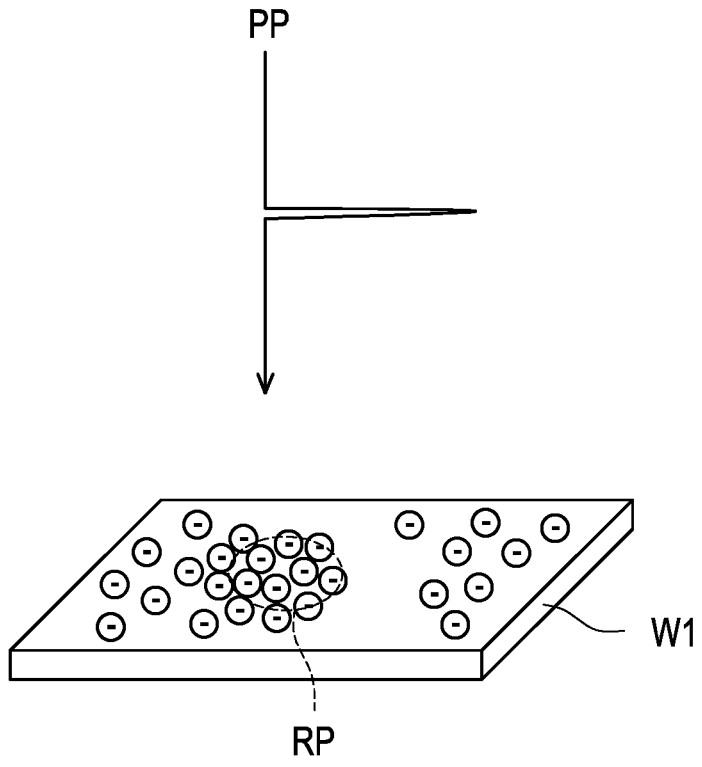
Figure 1D:
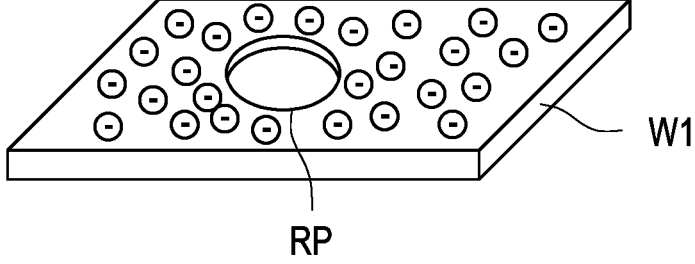

The laser processing method includes: irradiating a processing area RP of a workpiece W1 with an electromagnetic wave E (as shown in FIG. 1A) to change the distribution of free electrons on the workpiece W1 (as shown in FIG. 1B). The laser processing method further includes: after irradiating the processing area RP of the workpiece W1 with the electromagnetic wave E, irradiating the processing area RP of the workpiece W1 with a processing pulse PP (as shown in FIG. 1C) to remove the workpiece W1 at the processing area RP (as shown in FIG. 1D). The removal of the workpiece W1 at the processing area RP generally herein refers to the partial or complete removal of the workpiece W1 within the range shown by the processing area RP. Although FIG. 1D schematically shows that the workpiece W1 within the range of the processing area RP is completely removed, that is, the area of the workpiece W1 removed by the processing pulse PP is equal to the area of the processing area RP, the disclosure is not limited thereto. The area of the workpiece W1 removed by the processing pulse PP may be equal to, slightly smaller, or slightly larger than the irradiated area of the processing pulse PP, depending on the parameters of the applied electric field (such as the intensity of the electric field, the area of the applied electric field, the interval between the electric field and the processing pulse, and the angle of incidence) or the processing parameters (such as the power of the processing pulse PP or the parameters like the irradiation area). It is possible that the area of the workpiece W1 removed by the processing pulse PP is not equal to the area of the processing area RP as it may be controlled by the parameters of the applied electric field or of the machining.

Specifically, the electromagnetic wave E applies an electric field to the workpiece W1. When the workpiece W1 is subjected to an applied electric field, the distribution of free electrons on the workpiece W1 is changed by the electric field. At this time, the processing pulse PP irradiates the processing area RP to increase the number of free electrons rapidly. When the free electrons reach a certain density, the material is ejected from the surface and thus removed. The processing area RP generally refers to the to-be-removed area of the workpiece W1.

By irradiating the workpiece W1 with the electromagnetic wave E to apply an electric field to the workpiece W1, there is no need to further provide an electrode for forming an electric field on the workpiece W1, which improves the convenience in processing. With the effect of the applied electric field on the workpiece W1, the distribution of free electrons on the workpiece W1 (a conductor) changes, such that the material properties (such as refractive index, absorption rate, etc.) change accordingly. Performing the laser processing (i.e., irradiating the processing pulse PP onto the processing area RP) at this time would have different processing effects. For example, the energy of the processing pulse PP required may be reduced, but it is not limited thereto. In addition, as the parameters of the applied electric field are adjustable, there is more flexibility in the laser processing in terms of the manufacturing processes (such as the intensity of the electric field, the area of the applied electric field, the interval time and incident angle between the electric field and the processing pulse, the polarization state of the processing pulse, the polarization state of the excitation pulse, and the polarization state of the electromagnetic wave), which improves the processing quality, resolution, and control of the heat-affected zone effectively.

Figure 2:
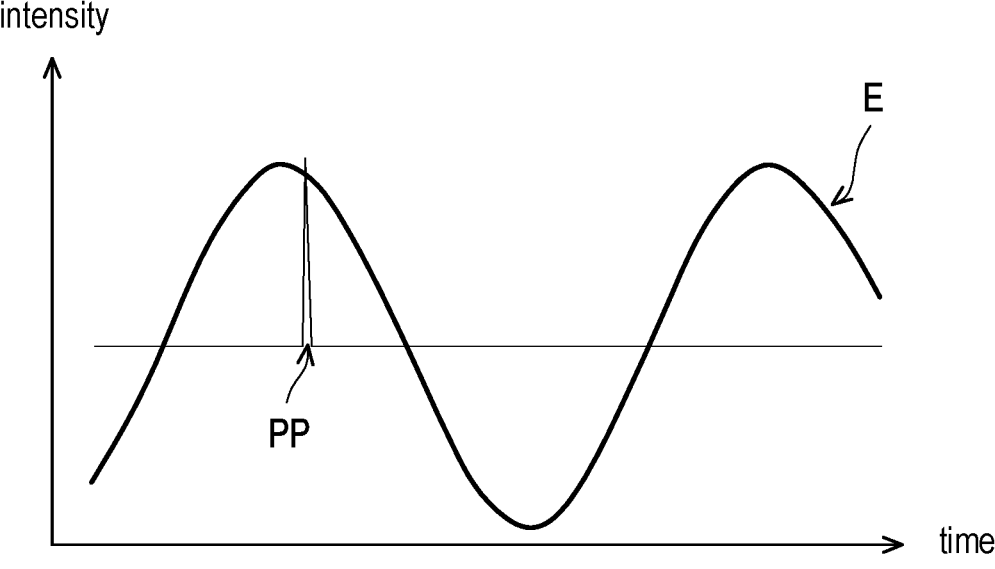
FIG. 2 and FIG. 3 are comparison diagrams of electromagnetic waves and processing pulse in the time domain.
Figure 3:
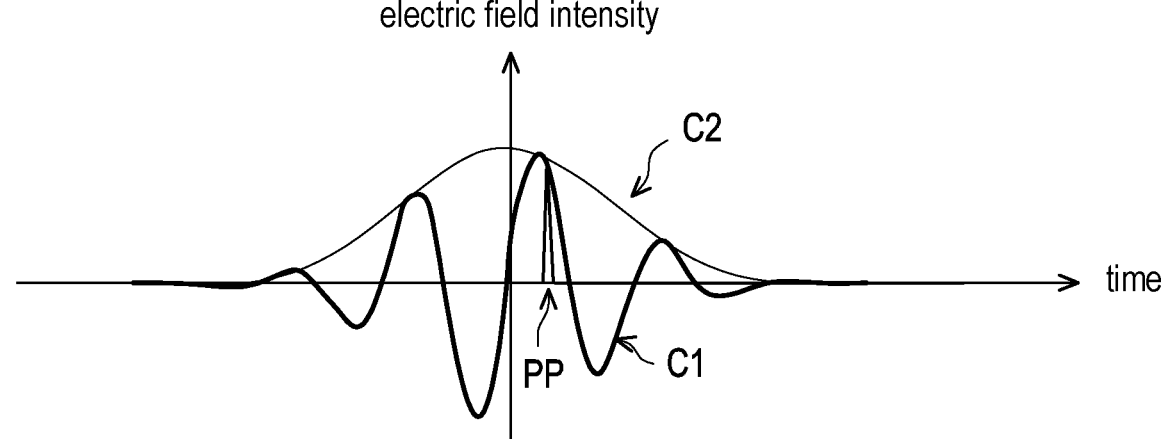

FIG. 2 and FIG. 3 are comparison diagrams of an electromagnetic wave and a processing pulse in the time domain. As shown in FIG. 2, the electromagnetic wave E may be optionally a low-frequency electromagnetic wave. The low-frequency electromagnetic wave means that the variation period of the electric field of the electromagnetic wave E is longer than the pulse width of the processing pulse PP. For example, the processing pulse PP may include femtosecond laser pulses, and the electromagnetic waves E may include, but not limited to, terahertz waves, megahertz waves, micron waves, microwaves, or lower frequency waves. Furthermore, the electromagnetic wave E may be a continuous low-frequency electromagnetic wave (see the electromagnetic wave E in FIG. 2) or a pulsed low-frequency electromagnetic wave (see the curve C1 in FIG. 3). The curve C2 in FIG. 3 refers to the envelope of the electric field.

Figure 4A:
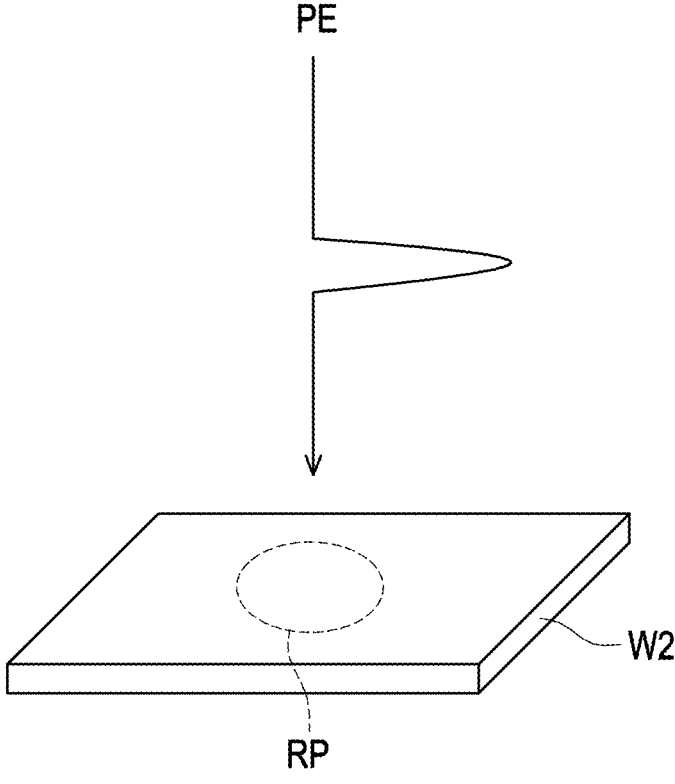
FIG. 4A to FIG. 4F are schematic flowcharts of a laser processing method according to another embodiment of the disclosure.
Figure 4B:
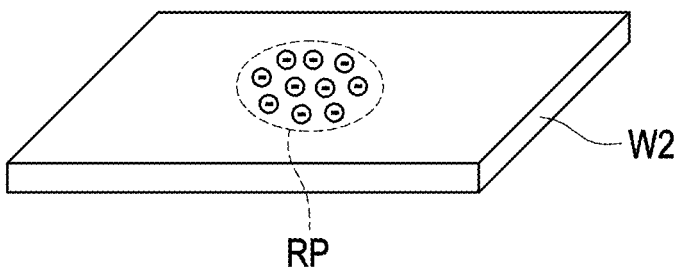
Figure 4C:
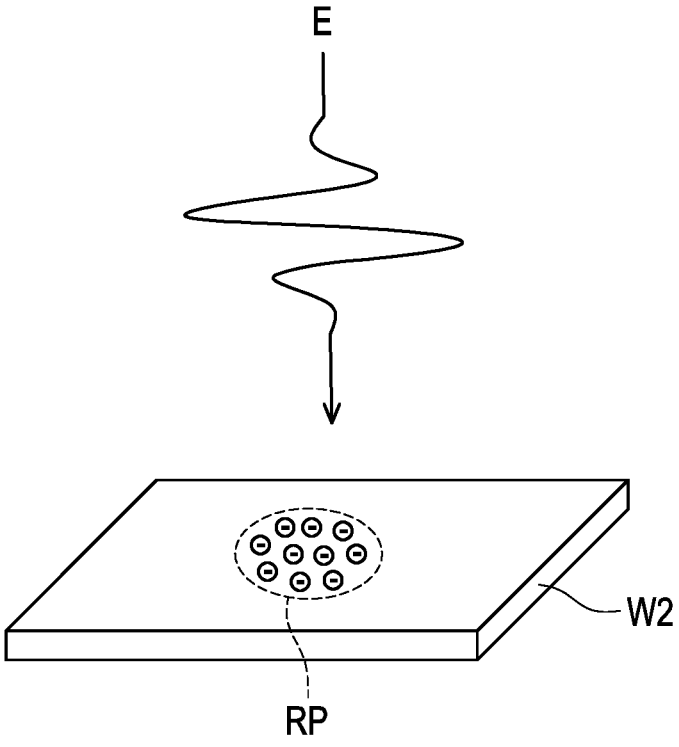
Figure 4D:
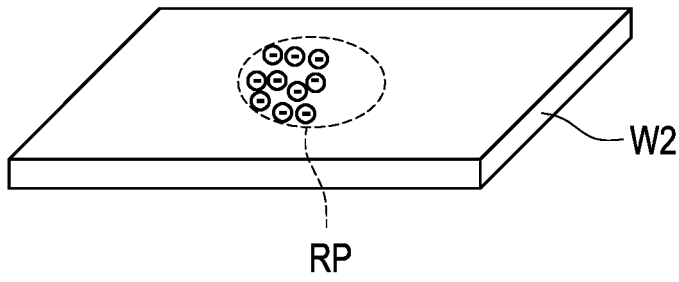
Figure 4E:
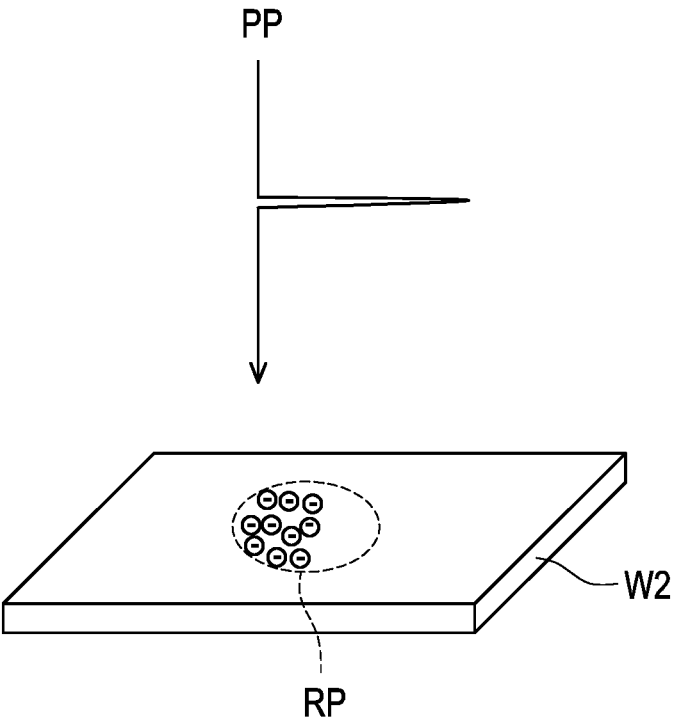
Figure 4F:
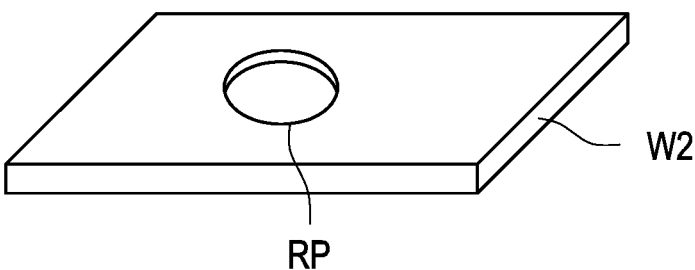

FIG. 4A to FIG. 4F are schematic flowcharts of a laser processing method according to another embodiment of the disclosure. In FIG. 4A to FIG. 4F, the workpiece W2 is, for example, a non-metallic material, such as a semiconductor material or an insulating material, but it is not limited thereto. In some embodiments, the workpiece W2 may also be a metallic material. Furthermore, the steps of FIG. 4C to FIG. 4F are similar to those of FIG. 1A to FIG. 1D. Their difference is that the laser processing method of this embodiment further includes: before irradiating the processing area RP of the workpiece W2 with the electromagnetic wave E (as shown in FIG. 4C), irradiating the processing area RP of the workpiece W2 with excitation light, such as an excitation pulse PE (as shown in FIG. 4A) to excite the electrons in covalent bands, such that excited free electrons are present in the conduction band (as shown in FIG. 4B). Although not shown, the excitation light in some embodiments may also be continuous-wave laser. Next, the processing area RP of the workpiece W2 is irradiated with the electromagnetic wave E (as shown in FIG. 4C) to change the distribution of free electrons (as shown in FIG. 4D), such that the electrons are expelled by the effect of the applied electric field. Then, the processing area RP of the workpiece W2 (as shown in FIG. 4E) is irradiated with the processing pulse PP to remove the workpiece W2 in the processing area RP (as shown in FIG. 4F). As mentioned above, the area of the workpiece W2 removed by the processing pulse PP may or may not be equal to the area of the processing area RP, as it may be controlled by the parameters of the applied electric field or of the machining.

Figure 5:
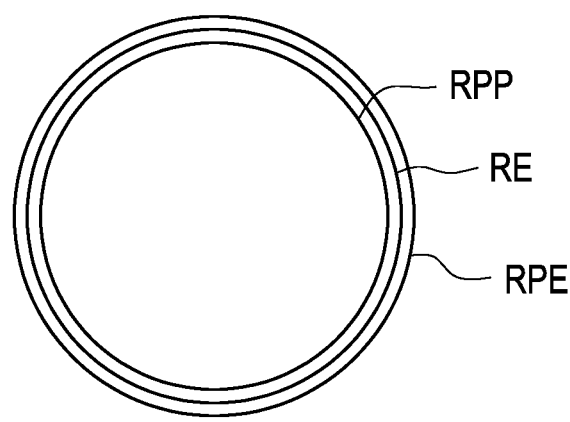
FIG. 5 and FIG. 6 are respectively two schematic top views of the irradiation areas of electromagnetic waves, processing pulse, and excitation pulses.
Figure 6:
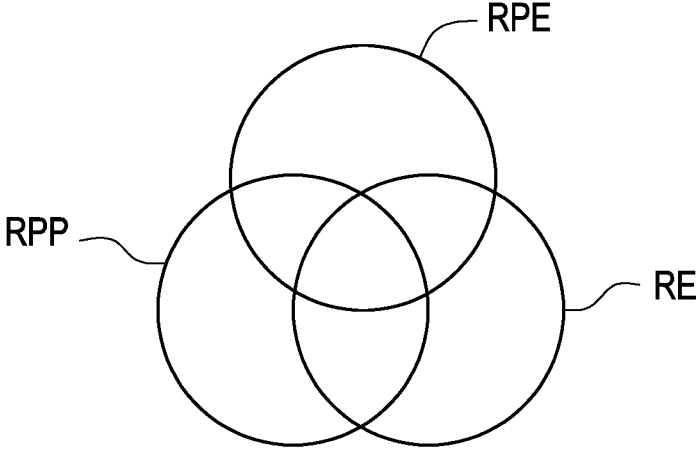

FIG. 5 and FIG. 6 are respectively two schematic top views of the irradiation areas of electromagnetic waves, processing pulse, and excitation pulses. In some embodiments, the irradiation area RE of the electromagnetic wave, the irradiation area RPP of the processing pulse, and the irradiation area RPE of the excitation pulse may all be circular, overlap one another, and share a center, as shown in FIG. 5, but it is not limited thereto. It should be understood that the shape, size, and relative position of the irradiation areas may vary as desired. For example, the shapes of the irradiation region RE of the electromagnetic wave, the irradiation region RPP of the processing pulse, and the irradiation region RPE of the excitation pulse may be other shapes; the size of the irradiation area RE of the electromagnetic wave, the irradiation area RPP of the processing pulse, and the irradiation area RPE of the excitation pulse may all be the same, or the two of the irradiation areas are the same while the other are different, or all three are different; and/or, the irradiation area RE of the electromagnetic wave, the irradiation area RPP of the processing pulse, and the irradiation area RPE of the excitation pulse may not share a center. As shown in FIG. 6, the irradiation area RE of the electromagnetic wave, the irradiation area RPP of the processing pulse, and the irradiation area RPE of the excitation pulse may only overlap partially without sharing a center.

FIG. 7 to FIG. 10 are each a schematic diagram of a laser processing system according to some embodiments of the disclosure. For the convenience of description, FIG. 7 to FIG. 10 also show workpieces, such as the workpiece W1 or the workpiece W2.

Figure 7:
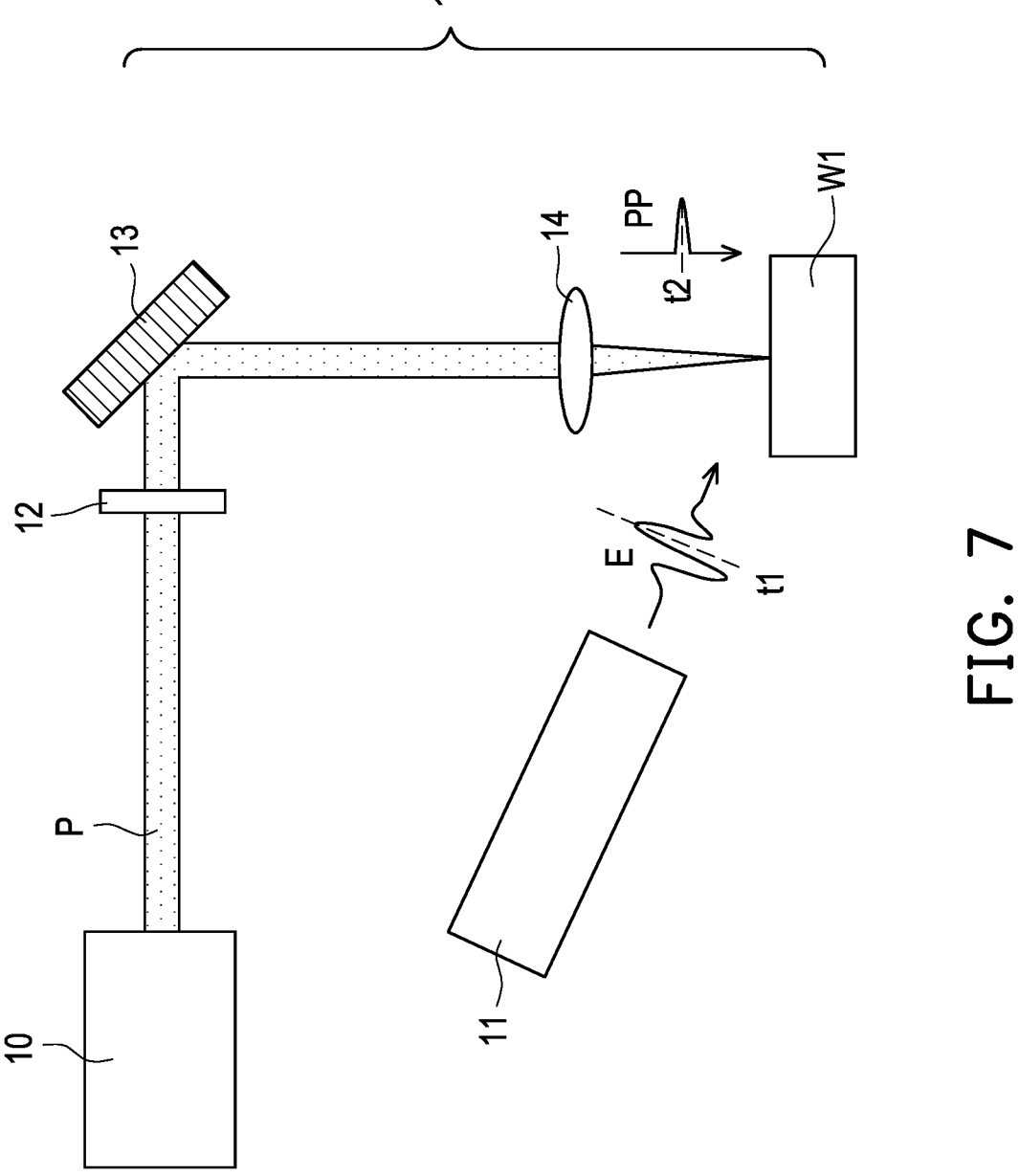
FIG. 7 to FIG. 10 are each a schematic diagram of a laser processing system according to some embodiments of the disclosure.

In FIG. 7, the laser processing system 1 performs processing on, for example, the workpiece W1 (a metal material). The laser processing system 1 may include a laser 10 and an electromagnetic-wave source 11. The laser 10 is configured to generate a processing pulse PP, and the electromagnetic-wave source 11 is configured to generate an electromagnetic wave E.

Based on different requirements, the laser processing system 1 may also include other elements. For example, the laser processing system 1 may further include a variable attenuator 12, a mirror 13, and a focusing lens 14, but it is not limited thereto.

The variable attenuator 12 is disposed on the transmission path of a laser pulse P emitted from the laser 10 and is, for example, located between the laser 10 and the mirror 13. The variable attenuator 12 is configured to adjust the intensity of the laser pulse P (i.e., the processing pulse PP).

The mirror 13 is disposed on the transmission path of the laser pulse P travelling from the variable attenuator 12 and is, for example, located between the variable attenuator 12 and the focusing lens 14. The mirror 13 is configured to change the transmission direction of the laser pulse P, such that the layout of the laser processing system 1 is more flexible.

The focusing lens 14 is disposed on the transmission path of the laser pulse P travelling from the mirror 13, and is disposed, for example, between the mirror 13 and the workpiece W1. The focusing lens 14 is configured to focus the laser pulse P to the workpiece W1. For example, the focusing lens 14 may include one or more convex lenses, but it is not limited thereto.

In this embodiment, the electromagnetic wave E and the processing pulse PP are incident on the workpiece W1 from different directions. Take FIG. 7 as an example. The processing pulse PP is, for example, normally incident on the workpiece W1. In other words, the angle between the transmission path of the processing pulse PP and the surface of the workpiece W1 is 90 degrees or substantially 90 degrees, whereas the electromagnetic wave E is, for example, obliquely incident on the workpiece W1. In other words, the angle between the transmission path of the electromagnetic wave E and the surface of the workpiece W1 is between 0 degree and 90 degrees.

The time when the processing pulse PP irradiates the workpiece W1 is designed to be, for example, later than the time when the electromagnetic wave E irradiates the workpiece W1. In some embodiments, the time when the processing pulse PP irradiates the workpiece W1 is the time when the processing pulse PP irradiating the workpiece W1 reaches the peak value (e.g., at the time t2) or the time when the processing pulse PP starts to irradiate the workpiece W1, but it is not limited thereto. In addition, the time when the electromagnetic wave E irradiates the workpiece W1 may be any time point when the electric field intensity of the electromagnetic wave E is not zero. For example, the time when the electromagnetic wave E irradiating the workpiece W1 reaches the peak value (e.g., at the time t1) may be adopted as the time when the electromagnetic wave E irradiates the workpiece W1, but it is not limited thereto. For example, as shown in FIG. 3, when the electromagnetic wave E adopts a pulsed low-frequency electromagnetic wave, the time corresponding to the peak value of the processing pulse PP may be later than the time corresponding to the peak value of the electromagnetic wave E. It is schematically illustrated in FIG. 3 that the time corresponding to the peak value of the processing pulse PP is after the time corresponding to the maximum peak value (the maximum peak) of the electromagnetic wave E; however, it should be understood that the peak value of the electromagnetic wave E may refer to the position of any peak (three peaks are schematically shown in FIG. 3) or any trough (three troughs are schematically shown in FIG. 3) in the pulsed low-frequency electromagnetic wave. That is to say, the peak value of the processing pulse PP may be after any peak or trough of the electromagnetic wave E. When the electromagnetic wave E is continuous low-frequency electromagnetic waves (as shown in FIG. 2), the relative time difference or phase difference between the processing pulse PP and the electromagnetic wave E may be adjusted by the optical path design or the drive circuit design, such that the time when the processing pulse PP is irradiated on the workpiece W1 is later than the time when the electromagnetic wave E is irradiated on the workpiece W1. As mentioned above, the time when the electromagnetic wave E irradiates the workpiece W1 may be the time when the electromagnetic wave E irradiating the workpiece W1 reaches one of the peak values of (e.g., at the time t1) or any time point when the electric field intensity of the electromagnetic wave E is not zero. Despite that the time corresponding to the peak value of the processing pulse PP is after the time corresponding to one of the peak values of the electromagnetic wave E (e.g., the peak on the left) as schematically illustrated in FIG. 2 and FIG. 3, it is not limited thereto. In other embodiments, the time when the processing pulse PP irradiates the workpiece W1 may be between two adjacent time points when the electric field intensity of the electromagnetic wave E is 0.

Although there is only one electromagnetic-wave source 11 shown in FIG. 7, the number of the electromagnetic-wave sources 11 may also be plural. For example, multiple electromagnetic waves E may be applied to the same area or different areas of the workpiece W1 using a plurality of electromagnetic-wave sources 11. In addition, when the electromagnetic wave E adopts a pulsed low-frequency electromagnetic wave, the time when the electromagnetic wave E irradiates the workpiece W1 may be the same or different.

Figure 8:
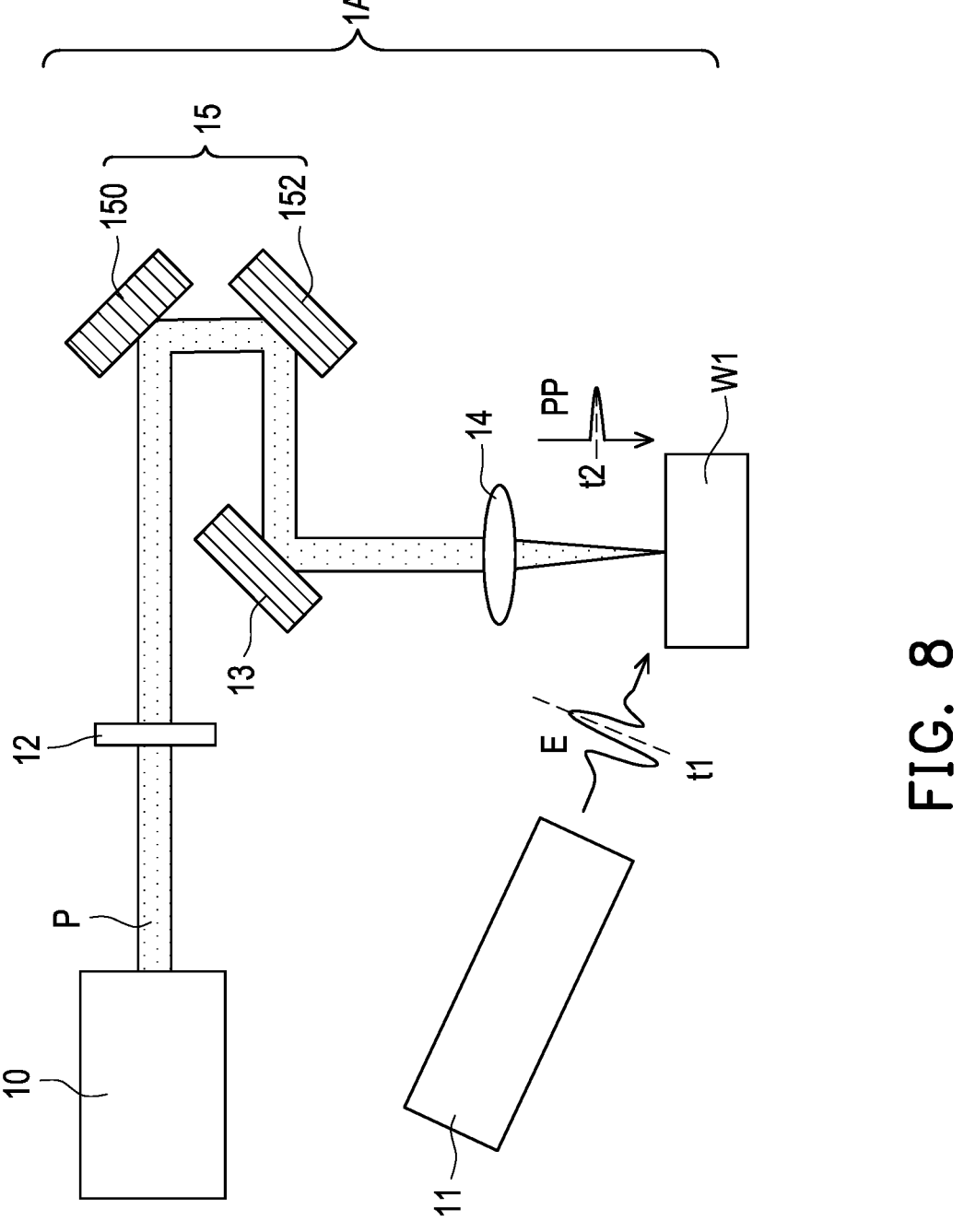

Please refer to FIG. 8. The main difference between the laser processing system 1A in FIG. 8 and the laser processing system 1 in FIG. 7 is that the laser processing system 1A further includes a delay optical path 15 disposed on the transmission path of a processing pulse PP (i.e., the laser pulse P). For example, the delay optical path 15 may be disposed on the transmission path of the laser pulse P travelling from a variable attenuator 12 and is disposed, for example, between the variable attenuator 12 and a mirror 13. The delay optical path 15 may include a mirror 150 and a mirror 152 disposed opposite to each other. The mirror 150 reflects the laser pulse P travelling from the variable attenuator 12 to the mirror 152, and the mirror 152 reflects the laser pulse P from the mirror 150 to the mirror 13. The time t2 when the processing pulse PP (i.e., the laser pulse P) is transmitted to the workpiece W1 can be controlled by moving the mirror 150 and the mirror 152 (for example, by translating the mirror 150 and the mirror 152 in FIG. 8 to the right or left together). Under this structure, through the delay optical path 15, the relative time difference or phase difference between the processing pulse PP and the electromagnetic wave E can be adjusted, such that the time when the processing pulse PP irradiates the workpiece W1 later than the time when the electromagnetic wave E irradiates the workpiece W1. For example, the time t2 when the processing pulse PP irradiating the workpiece W1 reaches the peak value is later than the time t1 when the electromagnetic wave E irradiating the workpiece W1 reaches any peak value (such as the peak or the trough shown in FIG. 2 or FIG. 3), but it is not limited thereto. In other embodiments, the time when the processing pulse PP irradiates the workpiece W1 (such as the time t1 or the time when the processing pulse PP starts to irradiate the workpiece W1) can be after any time point when the electric field intensity of the electromagnetic wave E is not 0, and between two adjacent time points when the electric field intensity of the electromagnetic wave E is 0. In addition, the way to adjust the relative time difference or phase difference between the processing pulse PP and the electromagnetic wave E is not limited to the above. For example, the relative time difference or phase difference between the processing pulse PP and the electromagnetic wave E may also be adjusted by a drive circuit design, but it is not limited thereto.

Figure 9:
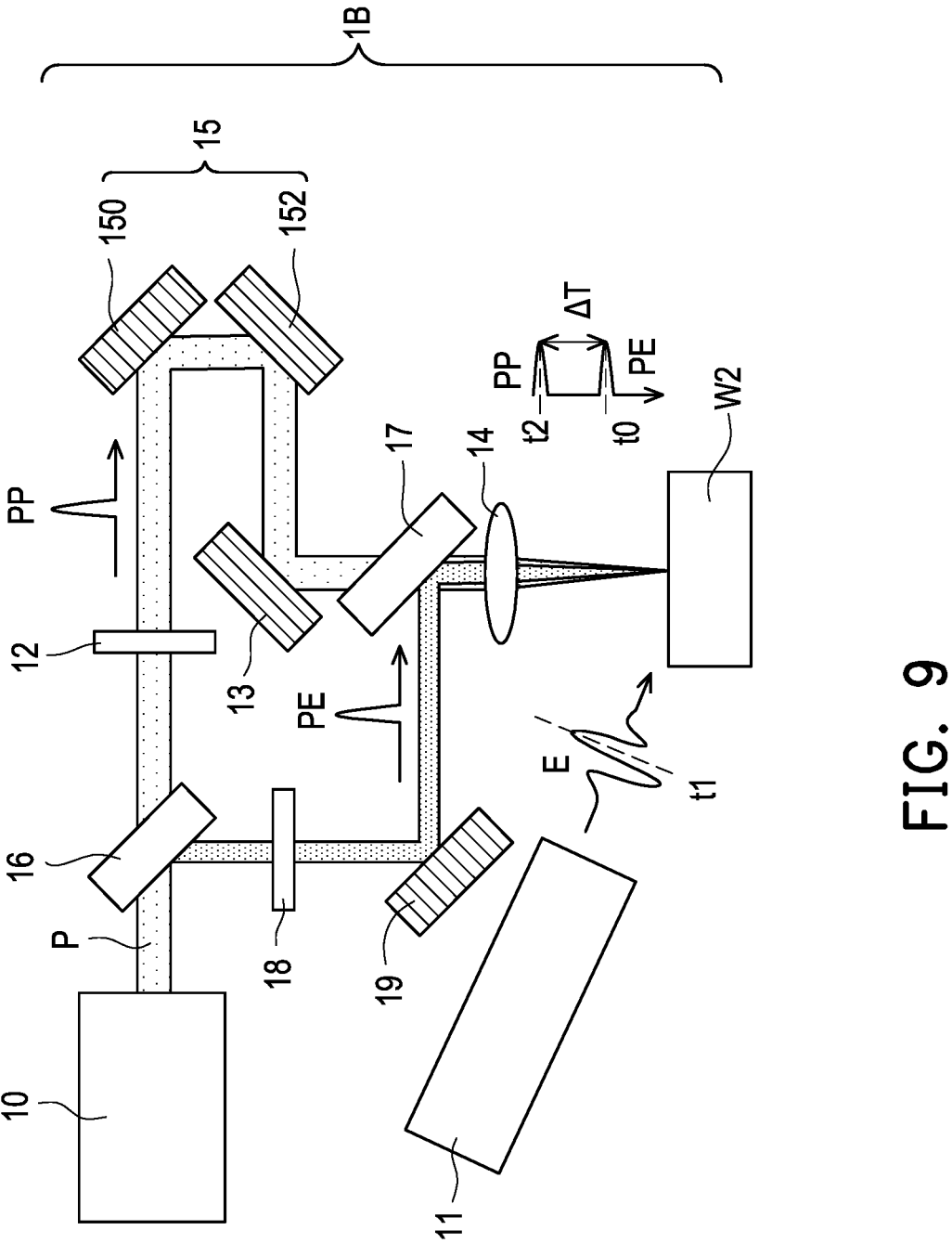

Please refer to FIG. 9. The main differences between the laser processing system 1B in FIG. 9 and the laser processing system 1A in FIG. 8 are as follows. The laser processing system 1B performs processing on, for example, the workpiece W2 (a non-metallic material or a metal material). In addition to the laser 10, the electromagnetic-wave source 11, the variable attenuator 12, the mirror 13, the focusing lens 14, and the delay optical path 15, the laser processing system 1B further includes, for example, a first beam splitter 16, a second beam splitter 17, a variable attenuator 18, and a mirror 19, but it is not limited thereto.

The first beam splitter 16 is disposed on the transmission path of a laser pulse P emitted from the laser 10 to split the laser pulse P into a processing pulse PP and an excitation pulse PE. The first beam splitter 16 may be a beam splitter or a polarization beam splitter. The delay optical path 15 is disposed on the transmission path of the processing pulse PP from the first beam splitter 16 and is disposed, for example, between the variable attenuator 12 and the mirror 13. The variable attenuator 18 is disposed on the transmission path of the excitation pulse PE from the first beam splitter 16 and is disposed, for example, between the first beam splitter 16 and the mirror 19. The variable attenuator 18 is configured to adjust the intensity of the excitation pulse PE. The second beam splitter 17 is disposed on the transmission paths of the excitation pulse PE from the first beam splitter 16 and the processing pulse PP from the delay optical path 15 to combine the transmission paths of the excitation pulse PE and the processing pulse PP. For example, the second beam splitter 17 may be disposed between the mirror 13 and the focusing lens 14 and between the mirror 19 and the focusing lens 14. In other words, the second beam splitter 17 is disposed on the transmission path of the processing pulse PP reflected by the mirror 13 and on the transmission path of the excitation pulse PE reflected by the mirror 19, and the second beam splitter 17 combines the transmission paths of the excitation pulse PE and the processing pulse PP, such that the excitation pulse PE and the processing pulse PP are transmitted to the focusing lens 14 along the same path. The second beam splitter 17 may be a beam splitter or a polarization beam splitter.

Under this structure, through the delay optical path 15, the time difference ΔT between the processing pulse PP and the excitation pulse PE may be adjusted, such that the time when the processing pulse PP irradiates the workpiece W1 later than the time when the excitation pulse PE irradiates the workpiece W1. For example, the time t2 when the processing pulse PP irradiating the workpiece W2 reaches the peak value is later than the time t0 when the excitation pulse PE irradiating the workpiece W2 reaches the peak value, but it is not limited thereto (for example, the time when the processing pulse PP starts to irradiate the workpiece W2 may also be later than the time when the excitation pulse PE starts to irradiate the workpiece W2). In addition, the time difference or phase difference between the excitation pulse PE and the electromagnetic wave E may also be adjusted through another delay optical path (which is not shown herein, and may be disposed, for example, between the first beam splitter 16 and the second beam splitter 17), such that the time when the electromagnetic wave E irradiates the workpiece W1 is later than the time when the excitation pulse PE irradiates the workpiece W1. For example, the time t0 when the excitation pulse PE irradiating the workpiece W2 reaches the peak value is earlier than the time t1 when the electromagnetic wave E irradiating the workpiece W2 reaches one of the peak values (such as the peak or the trough as shown in FIG. 2 or FIG. 3), but it is not limited thereto.

Figure 10:
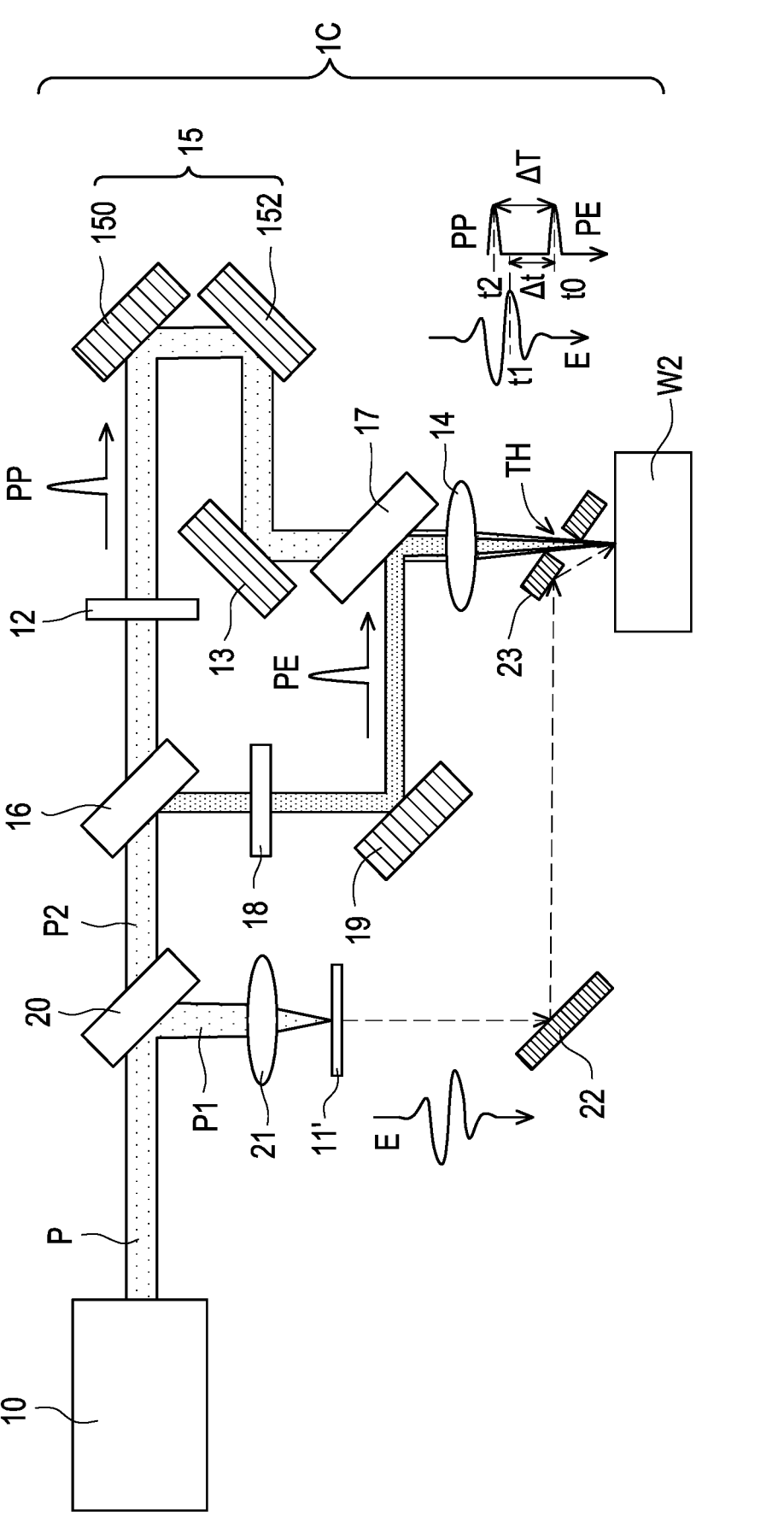

In the above embodiments, the electromagnetic wave E is directly generated by the electromagnetic-wave source 11, instead of being excited by the laser pulse P output by the laser 10, but the disclosure is not limited thereto. As shown in FIG. 10, in the laser processing system 1C, the electromagnetic wave E, the processing pulse PP, and the excitation pulse PE may share one source. Specifically, the electromagnetic wave E may be generated by irradiating an electromagnetic-wave source 11' with a laser pulse P emitted from the laser 10. For example, the material of the electromagnetic-wave source 11' may include zinc telluride, and the electromagnetic wave E may include a terahertz waves or megahertz wave, but it is not limited thereto. In other embodiments, the material of the electromagnetic-wave source 11' may include tellurium-doped gallium selenide or other nonlinear materials capable of generating electromagnetic waves by optical rectification or other optical nonlinear effects.

In addition to the laser 10, the electromagnetic-wave source 11', the variable attenuator 12, the mirror 13, the focusing lens 14, the delay optical path 15, the first beam splitter 16, the second beam splitter 17, the variable attenuator 18, and the mirror 19, the laser processing system 1C further includes, for example, a beam splitter 20, a focusing lens 21, a first off-axis parabolic mirror 22, and a second off-axis parabolic mirror 23, but it is not limited thereto.

The beam splitter 20 is disposed on the transmission path of the laser pulse P emitted from the laser 10 to split the laser pulse P into a first laser pulse P1 and a second laser pulse P2. The beam splitter 20 may include a general beam splitter or a polarized beam splitter. The focusing lens 21 is disposed on the transmission path of the first laser pulse P1 and is located, for example, between the beam splitter 20 and the electromagnetic-wave source 11'. The focusing lens 21 is configured to focus the first laser pulse P1 on the electromagnetic-wave source 11', and the focusing lens 21 may include one or more convex lenses, but it is not limited thereto. The electromagnetic-wave source 11' is disposed on the transmission path of the first laser pulse P1 and is located, for example, between the focusing lens 21 and the first off-axis parabolic mirror 22. The electromagnetic-wave source 11' generates an electromagnetic wave E after being irradiated by the first laser pulse P1. The first off-axis parabolic mirror 22 is disposed on the transmission path of the electromagnetic wave E travelling from the electromagnetic-wave source 11' to reflect the electromagnetic wave E to the second off-axis parabolic mirror 23. The first beam splitter 16 is disposed on the transmission path of the second laser pulse P2 to split the second laser pulse P2 into a processing pulse PP and an excitation pulse PE. The second off-axis parabolic mirror 23 is disposed on the transmission path of the electromagnetic wave E travelling from the first off-axis parabolic mirror 22 to reflect the electromagnetic wave E to the workpiece W2. In addition, the second off-axis parabolic mirror 23 has a through hole TH, through which the excitation pulse PE and the processing pulse PP from the second beam splitter 17 pass through the through hole TH to reach the workpiece W2.

Under this structure, the time difference ΔT between the processing pulse PP and the excitation pulse PE may be adjusted through the delay optical path 15. In some embodiments, a delay optical path (which is not shown herein; please refer to the configuration of the delay optical path 15 using two mirrors) is further disposed between the beam splitter 20 and the focusing lens 21 to adjust the time difference Δt between the excitation pulse PE and the electromagnetic wave E, such that the time when the electromagnetic wave E irradiates the workpiece W1 is later than the time when the excitation pulse PE irradiates the workpiece W1, and the time t2 when the processing pulse PP irradiates the workpiece W2 is later than the time when the electromagnetic wave E irradiates the workpiece W2. For example, the time t0 when the excitation pulse PE irradiating the workpiece W2 reaches the peak value is earlier than the time t1 when the electromagnetic wave E irradiating the workpiece W2 reaches one of the peak values (such as the peak or the trough as shown in FIG. 2 or FIG. 3), and the time t2 when the processing pulse PP irradiating the workpiece W2 reaches the peak value is later than the time t1 when the electromagnetic wave E irradiating the workpiece W2 reaches one of the peak values.

In addition, a nonlinear crystal may be selectively disposed on the transmission paths of the excitation pulse PE and the processing pulse PP to perform wavelength conversion. For example, the nonlinear crystal converts the processing pulse PP into a UV pulse to obtain a smaller focus point and improve the processing precision, but it is not limited thereto.

To sum up, in the embodiments of the disclosure, the electromagnetic wave generated by the electromagnetic-wave source applies a low-frequency electric field to a workpiece, and as the laser parameters are adjustable, there is more flexibility in the laser processing in pursuit of quality. In addition, by applying a low-frequency electric field to instantly change the distribution of the excited electrons of a material and thus its properties, followed by providing corresponding pulse parameters to remove the material, the processing quality, precision, and/or resolution may be improved effectively.

Although the disclosure has been disclosed by the embodiments above, they are not intended to limit the disclosure. Anyone with ordinary knowledge in the art can make changes and modifications without departing from the spirit and scope of the disclosure. Therefore, the protection scope of the disclosure shall be determined by the scope of the claims attached.

What is claimed is:

1. A laser processing system, comprising:
a laser configured to generate a processing pulse;
a beam splitter disposed on a transmission path of the laser pulse emitted from the laser and configured to split the laser pulse into a first laser pulse and a second laser pulse;
an electromagnetic-wave source configured to generate an electromagnetic wave, wherein the processing pulse comprises femtosecond laser pulses, and the electromagnetic wave comprises terahertz waves, megahertz waves, micron waves, or microwaves, wherein the electromagnetic-wave source is disposed on a transmission path of the first laser pulse, and the electromagnetic-wave source is irradiated by the first laser pulse to generate the electromagnetic wave;
a first beam splitter disposed on a transmission path of the second laser pulse to split the second laser pulse into a processing pulse and the excitation pulse;
a delay optical path disposed on a transmission path of the processing pulse from the first beam splitter; and
a second beam splitter disposed on a transmission path of the excitation pulse from the first beam splitter and the transmission path of the processing pulse from the delay optical path and configured to combine the transmission path of the excitation pulse and the transmission path of the processing pulse.

2. The laser processing system according to claim 1, wherein a material of the electromagnetic-wave source comprises zinc telluride or other nonlinear materials, and the electromagnetic wave comprises the terahertz waves or the megahertz waves.

3. The laser processing system according to claim 1, further comprising:
a first off-axis parabolic mirror disposed on a transmission path of the electromagnetic wave from the electromagnetic-wave source; and
a second off-axis parabolic mirror disposed on the transmission path of the electromagnetic wave from the first off-axis parabolic mirror and having a through hole, wherein the excitation pulse and the processing pulse from the second beam splitter pass through the through hole to reach to a workpiece.

* * * * *